(12) United States Patent
Mabuchi (10) Patent No.: US 8,868,840 B2
(45) Date of Patent: Oct. 21, 2014

(54) INFORMATION PROCESSING DEVICE AND METHOD, AND PROGRAM

(75) Inventor: Takuma Mabuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 223 days.

(21) Appl. No.: 13/489,779

(22) Filed: Jun. 6, 2012

(65) Prior Publication Data

US 2012/0324169 A1  Dec. 20, 2012

(30) Foreign Application Priority Data

Jun. 14, 2011 (JP) ................................ 2011-132018

(51) Int. Cl.
*G06F 12/08* (2006.01)
*G06F 17/30* (2006.01)

(52) U.S. Cl.
CPC .............................. *G06F 17/30129* (2013.01)
USPC ......................................................... 711/133

(58) Field of Classification Search
CPC ........................ G06F 12/0802; G06F 17/30129
See application file for complete search history.

(56) References Cited

U.S. PATENT DOCUMENTS

| 7,840,749 | B2 * | 11/2010 | Maeda et al. | 711/112 |
| 7,844,772 | B2 * | 11/2010 | Moon et al. | 711/103 |

FOREIGN PATENT DOCUMENTS

JP    2003-308234    10/2003

* cited by examiner

*Primary Examiner* — Hiep Nguyen
(74) *Attorney, Agent, or Firm* — Sherr & Jiang, PLLC (57) ABSTRACT

Provided is an information processing device including a holding portion of a cache link that is formed such that, when clusters are recorded on a predetermined recording medium by a FAT file system and a FAT formed by link information of the clusters is also recorded on the predetermined recording medium by the system, an entry is arranged for each of the clusters located at a predetermined interval, the entry being formed by information including the link information extracted from the FAT, an information update portion that, when updating the cache link after data is additionally written to the clusters on the recording medium, updates the information for an update target entry among entries forming the cache link, and a configuration conversion portion that removes the update target entry updated from an original position in the cache link, and connects it to an endmost position of the cache link.

12 Claims, 7 Drawing Sheets

INFORMATION PROCESSING DEVICE AND METHOD, AND PROGRAM

BACKGROUND

The present technology relates to an information processing device and method and a program, and particularly relates to an information processing device and method and a program that improve a processing speed in random access even after data is additionally written.

In related art, a file allocation table (FAT) file system is known that manages various types of data as a file on a recording medium capable of random access, such as a hard disk (refer to Japanese Patent Application Publication No. JPA-2003-308234, for example).

In the FAT file system, a recording area of the recording medium is divided into recording units that are referred to as clusters, and reading and writing of the file is managed in units of the clusters. Further, link information of the clusters that form the file is recorded in a FAT. Therefore, if an information processing device tracks the clusters from the beginning of the FAT by referring to the FAT and identifies reading target data, the information processing device can read out the reading target data from the file.

SUMMARY

However, due to the configuration of the FAT, when the information processing device performs data access in an opposite direction, it is necessary to once more read the FAT each time from the beginning of the FAT. As a result, the processing speed is significantly low in comparison to a case in which data access is performed in a forward direction. Further, since it is necessary to refer to the FAT recorded on the recording medium each time, a delay occurs in data reading and writing.

In order to improve the processing speed, it is conceivable that the FAT recorded on the recording medium is cached as it is in a memory, such as a random access memory (RAM). However, in this case, particularly in a built-in device with a limited memory size, there are cases in which it is difficult to cache the whole FAT in the memory. In addition, even if the whole FAT is cached in the memory, it is necessary to once more read the FAT each time from the beginning of the FAT when data access is performed in the opposite direction.

Further, when the size of the file is increased by additional data writing, the size of the FAT that manages the file is also increased. As a result, it is more difficult to cache the whole FAT in the memory.

The present technology is devised in light of the foregoing circumstances, and makes it possible to improve a processing speed in random access even after data is additionally written.

An information processing device according to an aspect of the present technology includes: a holding portion of a cache link that is formed such that, when a plurality of clusters are recorded on a predetermined recording medium by a FAT file system and a FAT formed by link information of the plurality of clusters is also recorded on the predetermined recording medium by the FAT file system, an entry is arranged for each of the clusters located at a predetermined interval, the entry being formed by information including the link information that is extracted from the FAT; an information update portion that, when updating the cache link after data is additionally written to the clusters on the recording medium, updates the information for an update target entry among a plurality of the entries that form the cache link; and a configuration conversion portion that removes the update target entry updated by the information update portion from an original position in the cache link, and connects the update target entry to an endmost position of the cache link.

An offset value, a cluster number and a number of consecutive clusters may be included in the entry as the information.

The cache link may be updated based on a distance from the offset value that is included in a last entry of the cache link to an offset value of a cluster that is a target for additional writing.

The cache link may be updated when the distance from the offset value that is included in the last entry of the cache link to the offset value of the cluster that is the target for additional writing is equal to a predetermined multiple of a minimum value difference between the offset values of the entries that are adjacent to each other in the cache link.

An information processing method and a program according to an aspect of the present technology are a method and a program that correspond to the above-described information processing device according to the aspect of the present technology.

In the information processing device and method and the program according to the aspects of the present technology, a cache link is cached. The cache link is formed such that, when a plurality of clusters are recorded on a predetermined recording medium by a FAT file system and a FAT formed by link information of the plurality of clusters is also recorded on the predetermined recording medium by the FAT file system, an entry is arranged for each of the clusters located at a predetermined interval, the entry being formed by information including the link information that is extracted from the FAT. When updating the cache link after data is additionally written to the clusters on the recording medium, the information is updated for an update target entry among a plurality of the entries that form the cache link. The updated update target entry is removed from an original position in the cache link, and is connected to an endmost position of the cache link.

As described above, according to the present technology, it is possible to improve the processing speed in random access even after data is additionally written.

DETAILED DESCRIPTION OF THE EMBODIMENT(S)

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Overview of Present Technology

In order to facilitate an understanding of additional writing of data to a file according to the present technology, first, an overview of how to read out the data from the file will be explained.

A file management system according to the present technology records various types of data on a recording medium as a file using a file allocation table (FAT) file system. In the file management system that uses the FAT file system, as described above, when data is read out, it is necessary to once more read the data each time from the beginning of the FAT by referring to the FAT recorded on the recording medium.

Therefore, in order to increase a processing speed in data access, the file management system generates, as a cache link, an aggregation of link information by extracting at least one cluster from among respective pieces of link information of respective clusters recorded in the FAT, and caches the cache link in a memory, such as a RAM. In the generation of the cache link, extraction target clusters are determined at a given interval, or substantially uniformly in accordance with a memory size that is included in the respective pieces of link information of the respective clusters recorded in the FAT. When predetermined data in the file is set as a reading target, the file management system refers to the cache link that is cached in the memory, and reads out the FAT from the middle of the FAT based on the link information of a forward cluster that is closest to the predetermined data. Thus, the file management system can access the predetermined data.

In this manner, the file management system refers to the cache link that is cached in the memory, and can thus access the reading target data without having to once more read the FAT recorded on the recording medium each time from the beginning of the FAT. As a result, it is possible to improve a processing speed in random access.

Hereinafter, an embodiment of the present technology will be explained with reference to the drawings.

Configuration Example of File Management System

Figure 1:
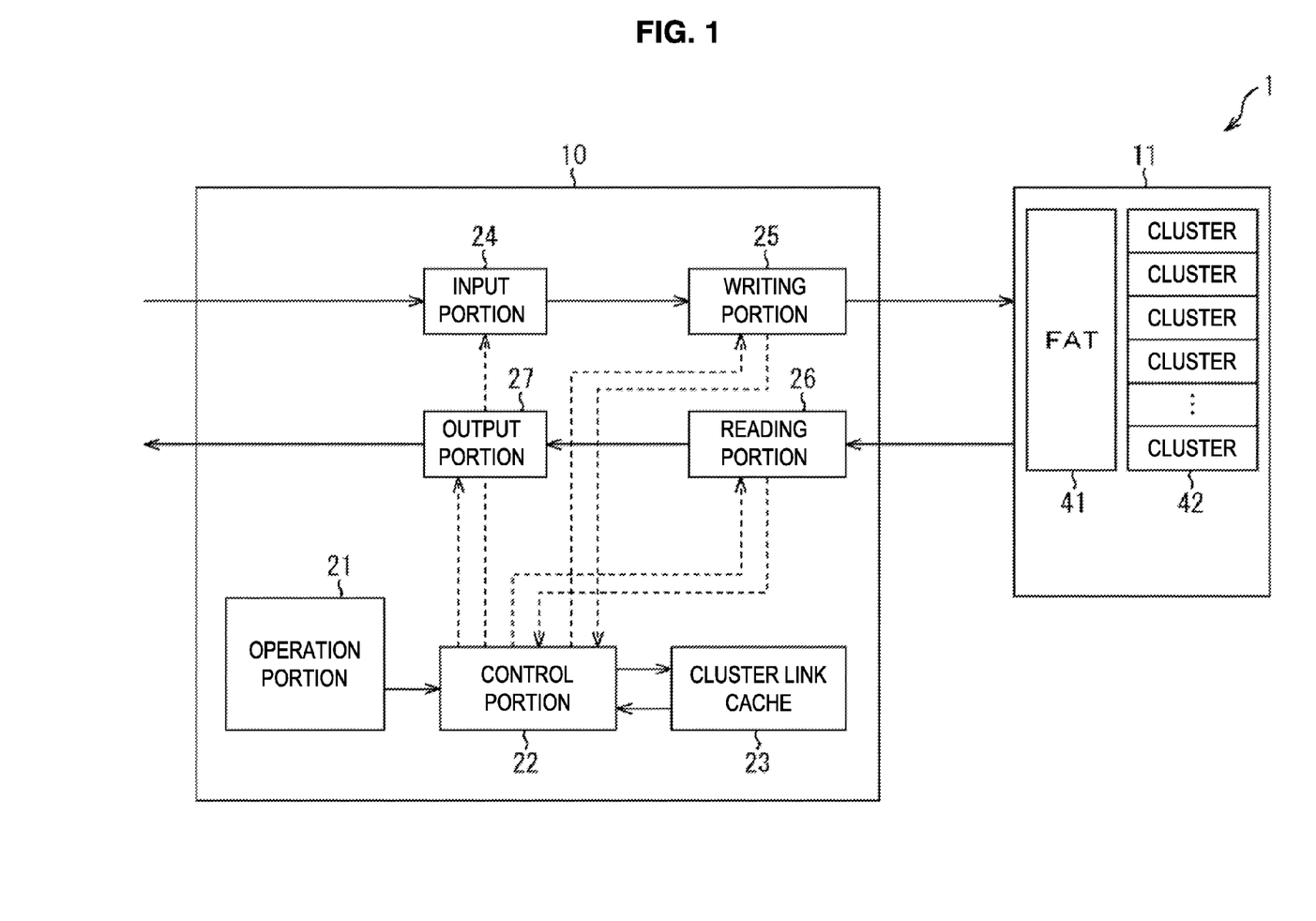
FIG. 1 is a block diagram showing a configuration example of a file management system.

FIG. 1 is a block diagram showing a configuration example of a file management system 1.

As shown in FIG. 1, the file management system 1 includes a file management device 10 and a recording medium 11.

The file management device 10 includes an operation portion 21, a control portion 22, a cluster link cache 23, an input portion 24, a writing portion 25, a reading portion 26 and an output portion 27.

The operation portion 21 receives an operation performed by a user, and supplies an operation signal corresponding to the operation to the control portion 22.

The control portion 22 analyzes the operation signal supplied from the operation portion 21, and thereby recognizes content of the operation performed by the user. The control portion 22 performs control in accordance with the operation content.

The cluster link cache 23 is formed by a memory, such as a RAM, and caches a cache link in accordance with the control by the control portion 22. Note that the cache link will be described in detail later with reference to FIG. 3.

In accordance with the control by the control portion 22, the input portion 24 converts data input from the outside into a format that can be recorded on the recording medium 11, and supplies the converted data to the writing portion 25.

The writing portion 25 writes the data supplied from the input portion 24 into the recording medium 11, in accordance with the control by the control portion 22. At this time, the writing portion 25 writes the data into the recording medium 11 while referring to the cache link that is cached in the cluster link cache 23 and to an FAT 41 that is stored on the recording medium 11, which will be described later.

The reading portion 26 reads out data from the recording medium 11 in accordance with the control by the control portion 22. At this time, the reading portion 26 reads out the data from the recording medium 11 while referring to the cache link that is cached in the cluster link cache 23 and to the FAT 41 stored on the recording medium 11, which will be described later.

The output portion 27 generates output data based on the data read out by the reading portion 26, and outputs the output data to the outside.

The recording medium 11 includes the FAT 41 and a data area 42.

Link information of clusters that form a predetermined file is recorded in the FAT 41. The FAT 41 will be described in more detail later with reference to FIG. 2.

The data area 42 is divided into a plurality of clusters, and data included in the predetermined file is recorded in units of the clusters.

Hereinafter, the FAT 41 and the cache link will be explained in detail with reference to FIG. 2 and FIG. 3, respectively, for the data that is recorded in the data area 42.

Configuration Example of FAT 41

Figure 2:
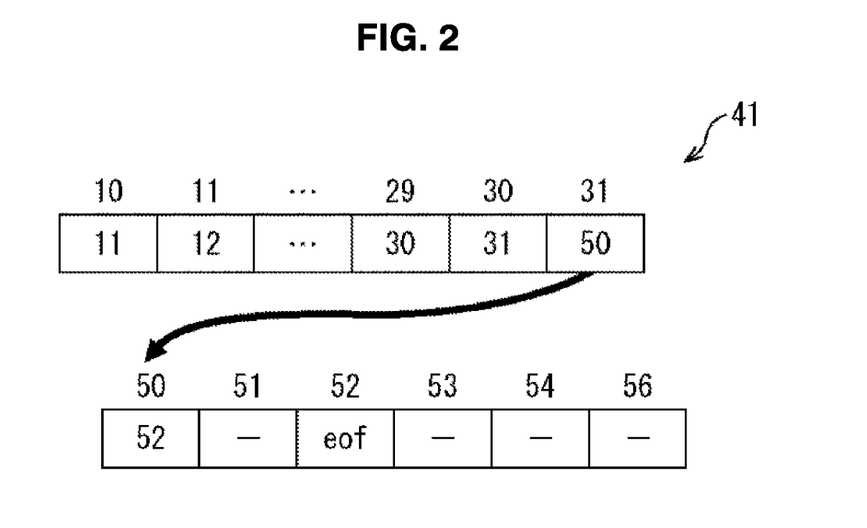
FIG. 2 is a diagram showing a configuration example of a file allocation table (FAT)

FIG. 2 is a diagram showing a configuration example of the FAT 41.

In FIG. 2, the FAT 41 is configured by a plurality of items (rectangular frames). Numbers written above the respective items are cluster numbers of the clusters that form the predetermined file that is recorded in the data area 42. Numbers written in the respective items are cluster numbers that come after the cluster of the cluster number that is written above each item. More specifically, each item corresponds to the cluster of the cluster number written above each item, and link information indicating the cluster number of the cluster that comes after that cluster is stored.

Note that, hereinafter, in order to simplify the explanation, a cluster of a cluster number K (K is a given integer) is denoted as a cluster [K]. Further, when attention is paid to a certain cluster, a cluster that comes after the certain cluster is referred to as a next cluster.

Specifically, according to the leftmost item of the FAT 41, the next cluster of a cluster [10] is a cluster [11]. According to the second left item of the FAT 41, the next cluster of the cluster [11] is a cluster [12]. Clusters continue in a similar manner. The next cluster of a cluster [31] is a cluster [50] and the next cluster of the cluster [50] is a cluster [52]. Then, "eof" is written in the item that corresponds to the cluster [52], and therefore it can be seen that the cluster [52] is the last cluster of the predetermined file. Note that "eof" indicates "end of file".

In other words, in the example of the FAT 41 shown in FIG. 2, the predetermined file that is recorded in the data area 42 is formed by the cluster [10] to the cluster [31], the cluster [50] and the cluster [52]. The file management device 10 refers to the FAT 41 formed in this manner, and tracks the clusters in this order. Thus, the file management device 10 can read out the reading target data from the predetermined file.

Next, the cache link that is cached in the cluster link cache 23 will be explained in detail with reference to FIG. 3.

Configuration Example of Cache Link

Figure 3:
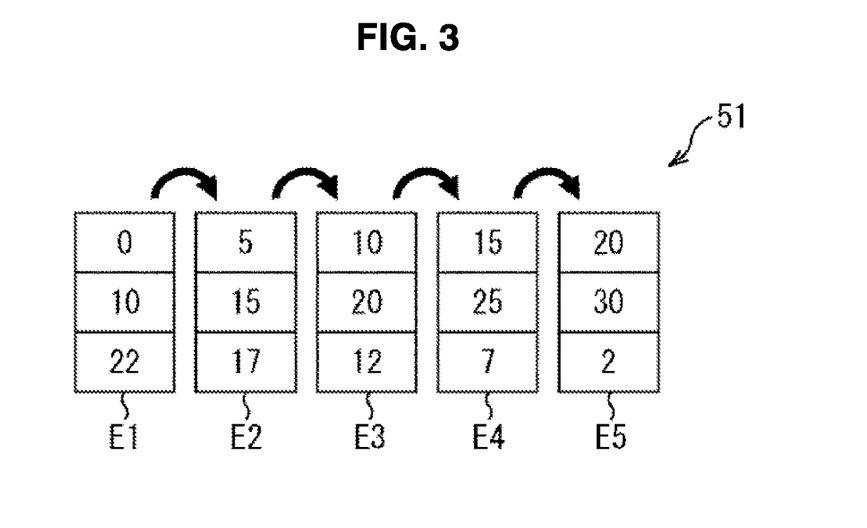
FIG. 3 is a diagram showing a configuration example of a cache link.

FIG. 3 is a diagram illustrating a configuration of a cache link 51.

The cache link 51 is an aggregation of the link information of the clusters whose link information is extracted at a given interval, or substantially uniformly in accordance with a memory size of the cluster link cache 23, from the respective pieces of link information of the respective clusters recorded in the FAT. In the present embodiment, it is assumed that a position at which each of the clusters is extracted is a position corresponding to a predetermined offset value from the beginning of the file.

In the example shown in FIG. 3, the link information of the clusters located at positions where offset values from the beginning of the predetermined file are 0, 5, 10, 15 and 20 is extracted from the FAT and aggregated, and this link information is cached as the cache link 51. Therefore, hereinafter, when the cache link 51 is generated, a position at which the link information of an extraction target cluster is stored is expressed by an offset value from the beginning of the predetermined file, and this position is referred to as a cache point. For example, in the example shown in FIG. 3, each of offset positions expressed by the offset values 0, 5, 10, 15 and 20 is the cache point.

The link information of one cluster included in the cache link 51 includes an offset value and a cluster number of the one cluster, and a number of consecutive clusters (hereinafter referred to as a consecutive cluster number) after the one cluster. Here, link information of each of the clusters included in the cache link 51 is referred to as an "entry". Note that each of the offset values included in each entry indicates each cache point.

In the example shown in FIG. 3, the cache link 51 is formed by five entries E1 to E5. Note that when there is no need to particularly distinguish between the entries E1 to E5, the entries E1 to E5 are referred to as entries E.

Specifically, from the values "0, 10, 22" shown in the entry E1, it can be found that the cluster located at the cache point at which the offset value from the beginning of the file is "0" is the cluster [10], and the consecutive cluster number from the cluster [10] is "22".

In a similar manner, from the values "5, 15, 17" shown in the entry E2, it can be found that the cluster located at the cache point at which the offset value from the beginning of the file is "5" is a cluster [15], and the consecutive cluster number from the cluster [15] is "17".

Further, from the values "10, 20, 12" shown in the entry E3, it can be found that the cluster located at the cache point at which the offset value from the beginning of the file is "10" is a cluster [20], and the consecutive cluster number from the cluster [20] is "12".

Further, from the values "15, 25, 7" shown in the entry E4, it can be found that the cluster located at the cache point at which the offset value from the beginning of the file is "15" is a cluster [25], and the consecutive cluster number from the cluster [25] is "7".

Further, from the values "20, 30, 2" shown in the entry E5, it can be found that the cluster located at the cache point at which the offset value from the beginning of the file is "20" is a cluster [30], and the consecutive cluster number from the cluster [30] is "2".

Further, as the link information included in each of the entries E, a pointer to the next link destination entry E is also included, as shown by arrows above the entries E1 to E5.

When predetermined data of the predetermined file is required to be read out, the file management system 1 refers to the cache link 51 that is cached in the cluster link cache 23. Then, based on the link information of the entry E that is closest to the predetermined data, the file management system 1 tracks the FAT from the middle of the FAT, and identifies the cluster including the predetermined data. Thus, the file management system 1 can read out the predetermined data.

For example, it is assumed that the position of a previous reading target cluster is a position at which the offset value of the predetermined file is 17. Note that, hereinafter, the offset value of the previous reading target cluster is referred to as a previous Read point.

Then, it is assumed that the cluster located at a position at which the offset value of the predetermined file is 13 is specified as a reading target. Note that, hereinafter, the offset value of the cluster that is specified as a current reading target is referred to as a Read offset.

In this manner, when the previous Read point is 17 and the Read offset is 13, the Read offset is forward of the previous Read point. In this case, with the known file management device that does not use a cache link, it is necessary to once more read the FAT in order from the beginning of the FAT (namely, from the position at which the offset value is 0).

In contrast to this, since the file management device 10 caches the cache link 51 in the cluster link cache 23, the file management device 10 can set the Read point to the position of a forward offset (the cache point) that is closest to the Read offset among the offsets (the cache points) included in each of the entries E of the cache link 51. As a result, from the viewpoint of the Read offset, the Read point has moved to a much closer position than the beginning of the predetermined file.

Therefore, as compared to a case in which the FAT is tracked from the beginning of the FAT and the Read offset is reached at last as in the related art, the file management device 10 can track the FAT from the Read point through a much shorter path and reach the Read offset. More specifically, the file management device 10 can track the FAT from the middle of the FAT by referring to the cache link 51. Therefore, it is possible to improve the processing speed, as compared to the case in which the FAT is tracked from the beginning of the FAT as in the related art.

Specifically, the file management device 10 sets the Read point based on the link information of the entry E3 having the offset (the cache point) that is closest to the Read offset and that is before the Read offset (namely, 13), and the file management device 10 refers to the FAT from the set Read point. More specifically, based on the values "10, 20, 12" shown in the entry E3, the file management device 10 sets the Read point to the position at which the offset value is 10, and refers to the FAT from the set Read point. Since the consecutive cluster number from the cluster [20] located at the position at which the offset value is 10 is 12, the cluster located at the Read offset position is identified as a cluster 1231. Therefore, the file management device 10 can read out the reading target data from the cluster [23].

Data reading processing (hereinafter referred to as reading processing) performed by the file management device 10 configured in this manner will be explained with reference to FIG. 4.

Note that, hereinafter, in order to simplify the explanation, a cache point of an offset value L (L is a given integer, and L is 0, 5, 10, 15 and 20 in the case of FIG. 3) is denoted as a cache point [L]. A Read point of an offset value M (M is a given integer) is denoted as a Read point [M]. Further, a Read offset of an offset value N (N is a given integer) is denoted as a Read offset [N].

Reading Processing

Figure 4:
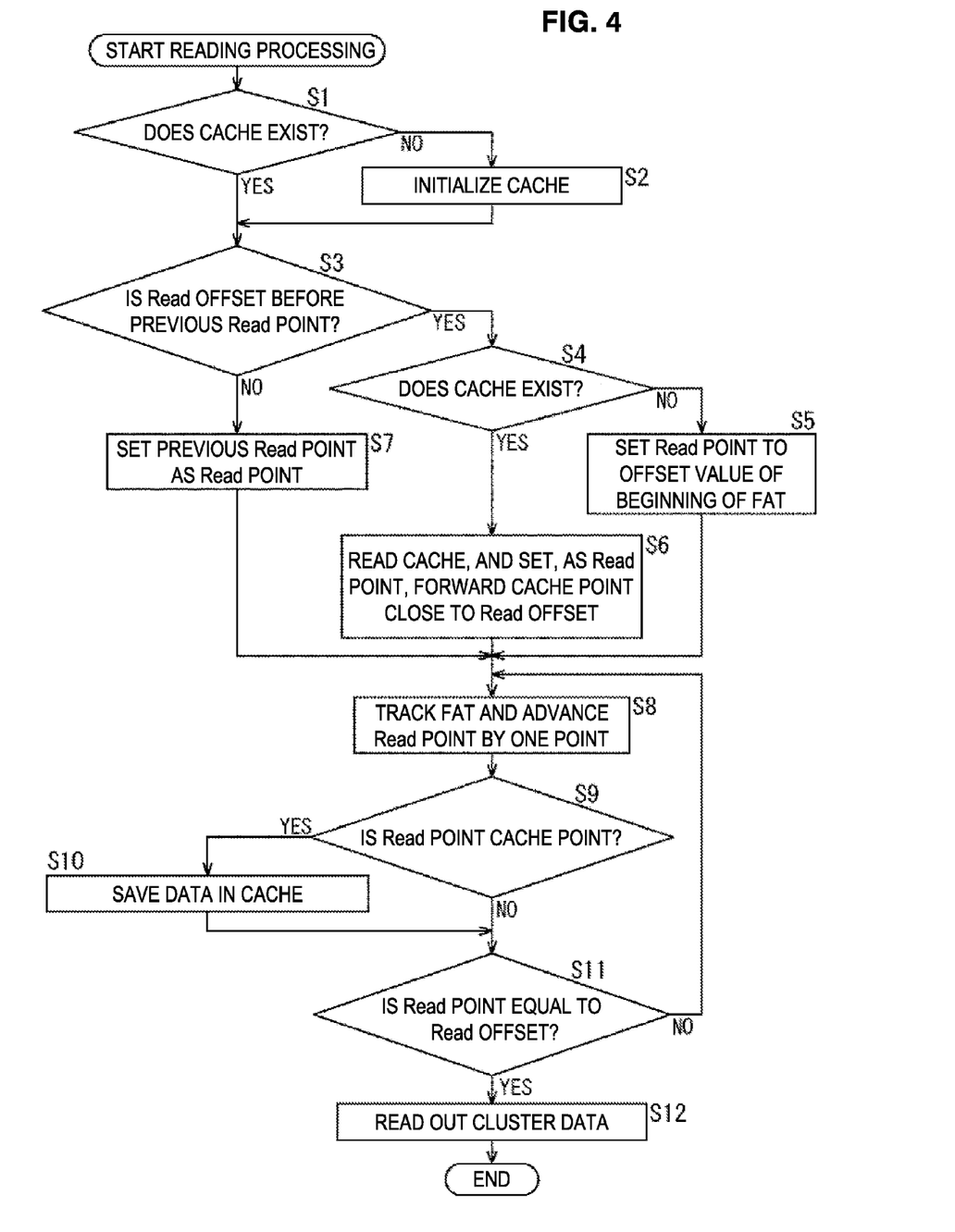
FIG. 4 is a flowchart illustrating a flow of reading processing.

FIG. 4 is a flowchart illustrating a flow of the reading processing.

The reading processing is started by a predetermined operation performed by the user on the operation portion 21.

At step S1, the control portion 22 determines whether or not there is a cache. In other words, the control portion 22 determines whether or not the cache link 51 is cached in the cluster link cache 23.

When there is a cache, YES is determined at step S1 and the processing proceeds to step S3. Note that processing from step S3 onwards will be described later.

In contrast to this, when there is no cache, NO is determined at step S1 and the processing proceeds to step S2.

At step S2, the cluster link cache 23 initializes the cache. More specifically, the cluster link cache 23 performs zero initialization etc. on the cluster link cache 23 in order to cache the cache link 51. After that, the processing proceeds to step S3.

At step S3, the control portion 22 determines whether or not the Read offset is before the previous Read point. More specifically, the control portion 22 determines whether or not the offset value of the cluster that is commanded to be read in this cycle is before the offset value read in the previous cycle.

When the Read offset is after (not before) the previous Read point, NO is determined at step S3, and the processing proceeds to step S7. Note that processing from step S7 onwards will be described later.

In contrast to this, when the Read offset is before the previous Read point, YES is determined at step S3, and the processing proceeds to step S4. Note that, hereinafter, in order to facilitate understanding of the flow of the reading processing, a case in which the Read offset is a Read offset [13] and the previous Read point is a Read point [17] will be explained as an example.

At step S4, the control portion 22 determines whether or not there is a cache. More specifically, the control portion 22 determines again whether or not there is a cache, in order to prepare to deal with a determination error at step S1 and an initialization failure by the processing at step S2.

When there is a cache, YES is determined at step S4 and the processing proceeds to step S6. Note that processing from step S6 onwards will be described later.

In contrast to this, when there is no cache, NO is determined at step S4 and the processing proceeds to step S5.

At step S5, the control portion 22 sets the Read point to the offset value of the beginning of the FAT. More specifically, when the cache link 51 is not cached, the control portion 22 cannot refer to the cache link 51. Therefore, the control portion 22 sets the Read point to a position at which the offset value of the beginning of the FAT is 0, namely, to a Read point [0]. In this case, the control portion 22 needs to track the FAT from the beginning of the FAT in a similar manner to the known file management device that does not use a cache link. When the Read point is set to the offset value of the beginning of the FAT, the processing proceeds to step S8.

At step S8, the control portion 22 tracks the FAT and advances the Read point by one point. For example, after the Read point is set to the Read point [0] in the processing at step S5, at step S8, the control portion 22 sets the Read point to a Read point [1].

At step S9, the control portion 22 determines whether or not the Read point is the cache point. More specifically, the control portion 22 determines whether or not the Read point is a cache point [0], [5], [10], [15] or [20].

For example, when the Read point is set to the Read point [1] in the processing at step S8, NO is determined at step S9 and the processing proceeds to step S11.

At step S11, the control portion 22 determines whether or not the Read point is equal to the Read offset. More specifically, the control portion 22 determines whether or not the Read point is equal to the Read offset [13].

For example, when the Read point is set to the Read point [1] in the processing at step S8, NO is determined at step S11 and the processing returns to step S8. Then, the processing from step S8 onwards is repeated. More specifically, in a time period during which the Read point becomes equal to the Read offset [13], namely, until a Read point [13] is set, loop processing from step S8 to step S11 is repeated.

Here, it is assumed that the loop processing is repeated a plurality of times and a Read point [4] is set at step S8 in a predetermined cycle. In this case, NO is determined at step S9 and then NO is determined at step S11, and the following processing is performed as step S8 in the next cycle.

More specifically, at step S8, the Read point is advanced from the Read point [4] by one point and is set to a Read point [5]. Here, the Read point [5] is the cache point. Therefore, YES is determined at step S9 and the processing proceeds to step S10.

At step S10, the control portion 22 saves data in the cache. More specifically, the control portion 22 saves, in the cache link 51, the link information of the cluster located at the position of the Read point. In this case, since the Read point is the Read point [5], the link information "5, 15, 17" is saved in the entry E2. When the data is saved in the cache, the processing proceeds to step S11.

For example, when the Read point is set to the Read point [5] in the processing at step S8, the Read point is not equal to the Read offset [13]. Therefore, NO is determined at step S11 and the processing returns to step S8.

Here, it is assumed that the loop processing is repeated a plurality of times and a Read point [9] is set at step S8 in the predetermined cycle. In this case, NO is determined at step S9 and then NO is determined at step S11, and the following processing is performed as step S8 in the next cycle.

More specifically, at step S8, the Read point is advanced from the Read point [9] by one point and is set to a Read point [10]. Here, the Read point [10] is the cache point. Therefore, YES is determined at step S9 and the processing proceeds to step S10.

At step S10, the control portion 22 saves data in the cache. In this case, since the Read point is the Read point [10], the link information "10, 20, 12" is saved in the entry E3. In this manner, while tracking the FAT, the link information is cached in each entry E in the cache link 51 as appropriate. Therefore, in the reading processing from the next cycle onwards, it is possible to appropriately read clusters by referring to the cache link 51. When the data is saved in the cache, the processing proceeds to step S11.

For example, when the Read point is set to the Read point [10] in the processing at step S8, the Read point is not equal to the Read offset [13]. Therefore, NO is determined at step S11 and the processing returns to step S8.

Here, it is assumed that the loop processing is repeated a plurality of times and a Read point [12] is set at step S8 in the predetermined cycle. In this case, NO is determined at step S9 and then NO is determined at step S11, and the following processing is performed as step S8 in the next cycle.

More specifically, at step S8, the Read point is advanced from the Read point [12] by one point and is set to the Read point [13]. Here, the Read point [13] is not the cache point. Therefore, NO is determined at step S9 and the processing proceeds to step S11.

For example, when the Read point is set to the Read point [13] in the processing at step S8, the Read point is equal to the Read offset [13]. Therefore, YES is determined at step S11 and the processing proceeds to step S12.

At step S12, the control portion 22 reads out cluster data. More specifically, the control portion 22 controls the reading portion 26 and reads out the reading target data from the cluster [23] located at the position of the Read offset [13].

This completes the reading processing. Note that the control portion 22 stands by until the reading processing for next data is commanded.

In this manner, when it is determined in the processing at step S4 that there is no cache (namely, the cache link 51 does not exist), the control portion 22 needs to track the FAT from the beginning of the FAT as shown by the processing from step S5 onwards, in a similar manner to the known file management device that does not use a cache link.

On the other hand, when there is a cache, YES is determined at step S4 and the processing proceeds to step S6.

At step S6, the control portion 22 reads the cache and sets, as the Read point, a forward cache point that is close to the Read offset. More specifically, in this example, since the Read offset is set to the Read offset [13] and the previous Read point is set to the Read point [17], the control portion 22 refers to the cache link 51 and searches for a forward cache point that is close to the Read offset [13]. In this case, since the forward cache point that is close to the Read offset [13] is the cache point [10], the control portion 22 sets the Read point to the Read point [10]. More specifically, the control portion 22 starts to track the FAT from the position at which the offset value is 10.

At step S8, the control portion 22 tracks the FAT and advances the Read point by one point. After the Read point is set to the Read point [10] in the processing at step S6 when there is a cache, at step S8, the control portion 22 sets the Read point to a Read point [11].

At step S9, the control portion 22 determines whether or not the Read point is the cache point. More specifically, the control portion 22 determines whether or not the Read point is the cache point [0], [5], [10], [15] or [20].

For example, when the Read point is set to the Read point [11] in the processing at step S8, NO is determined at step S9 and the processing proceeds to step S11.

At step S11, the control portion 22 determines whether or not the Read point is equal to the Read offset. More specifically, the control portion 22 determines whether or not the Read point is equal to the Read offset [13].

For example, when the Read point is set to the Read point [11] in the processing at step S8, NO is determined at step S11 and the processing returns to step S8. Then, the processing from step S8 onwards is repeated. More specifically, in a time period during which the Read point becomes equal to the Read offset [13], namely, until the Read point [13] is set, the loop processing from step S8 to step S11 is repeated.

Here, at step S8 in the next cycle, the Read point is advanced from the Read point [11] by one point and is set to the Read point [12]. In this case, NO is determined at step S9 and then NO is determined at step S11, and the following processing is performed as step S8 in the next cycle.

More specifically, at step S8, the Read point is advanced from the Read point [12] by one point and is set to the Read point [13]. Here, the Read point [13] is not the cache point. Therefore, NO is determined at step S9 and the processing proceeds to step S11.

For example, when the Read point is set to the Read point [13] in the processing at step S8, the Read point is equal to the Read offset [13]. Therefore, YES is determined at step S11 and the processing proceeds to step S12.

At step S12, the control portion 22 reads out cluster data. More specifically, the control portion 22 controls the reading portion 26 and reads out the reading target data from the cluster [23] located at the position of the Read offset [13].

This completes the reading processing. Note that the control portion 22 stands by until the reading processing for next data is commanded.

In this manner, the file management device 10 can track the FAT from the Read point by referring to the cache link 51. Therefore, it is possible to improve the processing speed as compared to a case in which the FAT is tracked from the beginning of the FAT as in the related art.

On the other hand, when the Read offset is after (not before) the previous Read point, NO is determined at step S3, and the processing proceeds to step S7. Note that, hereinafter, in order to facilitate understanding of the flow of the reading processing, a case in which the Read offset is a Read offset [17] and the previous Read point is the Read point [13] will be explained as an example.

At step S7, the control portion 22 sets the previous Read point as the Read point. More specifically, the control portion 22 sets the previous Read point [13] as the Read point, namely, the Read point [13] is set.

At step S8, the control portion 22 tracks the FAT and advances the Read point by one point. For example, after the Read point is set to the Read point [13] in the processing at step S7, at step S8, the control portion 22 sets the Read point to a Read point [14].

At step S9, the control portion 22 determines whether or not the Read point is the cache point. More specifically, the control portion 22 determines whether or not the Read point is the cache point [0], [5], [10], [15] or [20].

For example, when the Read point is set to the Read point [14] in the processing at step S8, NO is determined at step S9 and the processing proceeds to step S11.

At step S11, the control portion 22 determines whether or not the Read point is equal to the Read offset. More specifically, the control portion 22 determines whether or not the Read point is equal to the Read offset [17].

For example, when the Read point is set to the Read point [14] in the processing at step S8, NO is determined at step S11 and the processing returns to step S8. Then, the processing from step S8 onwards is repeated. More specifically, in a time period during which the Read point becomes equal to the Read offset [17], namely, until the Read point [17] is set, the loop processing from step S8 to step S11 is repeated.

Here, it is assumed that the loop processing is repeated a plurality of times and, at step S8 in the predetermined cycle, a Read point [15] is set. In this case, YES is determined at step S9, and in the processing at step S10, the link information "15, 25, 7" is saved in the entry E4. When the data is saved in the cache, the processing proceeds to step S11. NO is determined at step S11 and the processing returns to step S8.

Further, it is assumed that the loop processing from step S8 to step S11 is repeated a plurality of times and, at step S8 in the predetermined cycle, the Read point [17] is set. In this case, NO is determined at step S9, and the processing proceeds to step S11.

For example, when the Read point is set to the Read point [17] in the processing at step S8, the Read point is equal to the Read offset [17]. Therefore, YES is determined at step S11 and the processing proceeds to step S12.

At step S12, the control portion 22 reads out cluster data. More specifically, the control portion 22 controls the reading portion 26 and reads out the reading target data from a cluster [27] located at the position of the Read offset [17].

This completes the reading processing.

As explained above, the file management device 10 can track the FAT from the Read point by referring to the cache link 51. Therefore, it is possible to improve the processing speed as compared to a case in which the FAT is tracked from the beginning of the FAT as in the related art.

Next, the FAT 41 and the cache link 51 will be explained with reference to FIG. 5 and FIG. 6, respectively, for a case where data is additionally written to a predetermined file.

Configuration Example of FAT 41 after Data is Additionally Written

Figure 5:
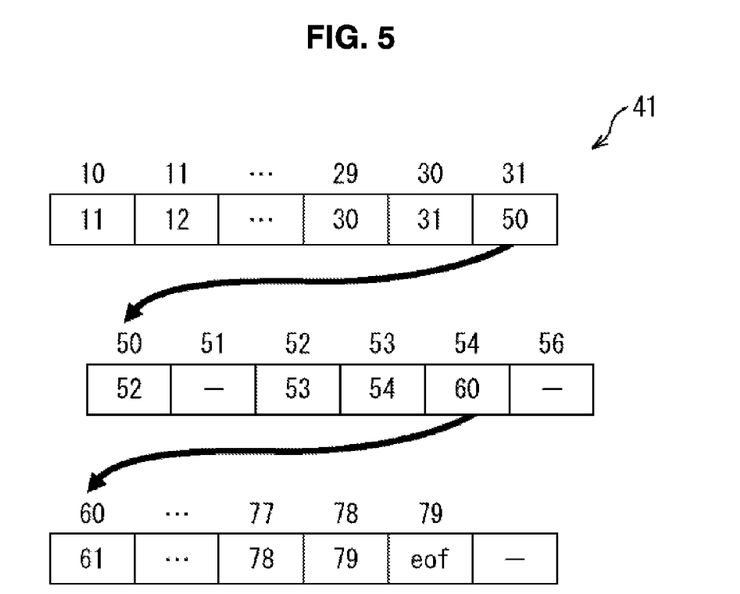
FIG. 5 is a diagram showing a configuration example of the FAT after additional data writing.

FIG. 5 is a diagram illustrating a configuration of the FAT 41 after additional data writing.

In the FAT 41 shown in FIG. 2, which shows a state before data is additionally written, the cluster [52] is the last cluster of the predetermined file. From this state, if data for 22 clusters is additionally written, the FAT 41 changes to a state shown in FIG. 5.

Specifically, the next cluster after the cluster [52] is a cluster [53] and the next cluster after the cluster [53] is a cluster [54]. Further, the next cluster after the cluster [54] is a cluster [60] and the next cluster after the cluster [60] is a cluster [61]. Clusters continue in a similar manner. The next cluster after a cluster [77] is a cluster [78] and the next cluster after the cluster [78] is a cluster [79]. Then, "eof" is written in the item that corresponds to the cluster [79], and therefore it can be seen that the cluster [79] is the last cluster of the predetermined file.

More specifically, in the example of the FAT 41 shown in FIG. 5, the predetermined file obtained after data is additionally written, which is recorded in the data area 42, is formed by the cluster [10] to the cluster [31], the cluster [50], the cluster [52] to the cluster [54], and the cluster [60] to the cluster [79]. The file management device 10 refers to the FAT 41 formed in this manner, and tracks the clusters in this order. Thus, the file management device 10 can read out the reading target data from the predetermined file.

Next, the cache link 51 that is cached in the cluster link cache 23 after data is additionally written to the file will be explained in detail with reference to FIG. 6.

Configuration Example of Cache Link after Data is Additionally Written

Figure 6:
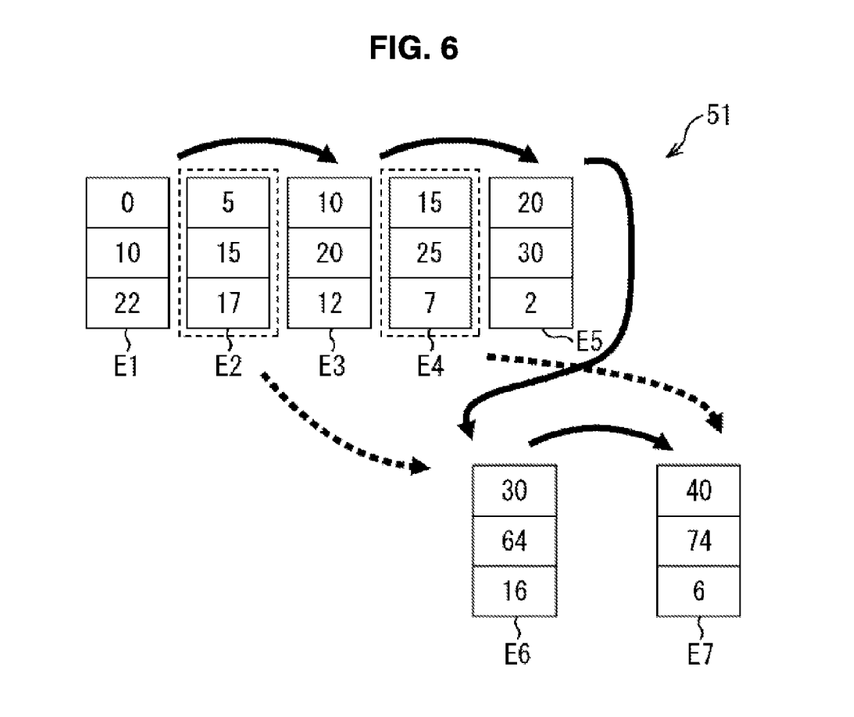
FIG. 6 is a diagram showing a configuration example of a cache link after additional data writing.

FIG. 6 is a diagram illustrating a configuration of the cache link 51 after additional data writing.

Even when data is additionally written to the predetermined file and the size of the FAT 41 increases, the memory size of the cluster link cache 23 does not change. Therefore, the file management device 10 may generate the cache link 51 such that, as the size of the FAT 41 increases, an interval between clusters extracted from the respective pieces of link information of the respective clusters recorded in the FAT 41, namely, an interval between the cache points, also increases.

However, if every time the size of the FAT 41 changes, the cache link 51 with an increased interval between the cache points is generated from the very beginning, it takes time to generate the cache link 51 and as a result, there is a possibility of deterioration in the processing speed for writing. Given this, in order to shorten the generation time of the cache link 51, the file management device 10 updates the link information that is included in a part of the entries E of the cache link 51 before additional data writing, to link information of the cluster after additional data writing. By reusing the part of the entries E in this manner, the file management device 10 newly generates the cache link 51. By doing this, it is possible to shorten the generation time as compared to a case in which the cache link 51 is generated from the very beginning.

An update and reuse timing of the link information in the entry E of the cache link 51 differs depending on how much the interval between the cache points is widened. Here, an example will be explained in which the interval between the cache points is doubled. More specifically, every time the cluster is additionally written, a difference between an offset value (hereinafter referred to as wp) of the cluster that is currently being additionally written and an offset value (hereinafter referred to as ceof) of the entry E that is at the end of the current cache link 51 is calculated. If the link information in the entry E is updated when the difference becomes equal to twice the interval between the cache points, the cache link 51 that doubles the interval between the cache points is obtained as a result. Here, the interval between the cache points in the current cache link 51 is equal to a minimum value (hereinafter referred to as min_diff) of the difference between offset values of the respective entries E that are adjacent to each other in the current cache link 51. Therefore, a timing at which the difference wp−ceof becomes equal to twice the interval between the cache points, namely, a timing at which the difference wp−ceof becomes equal to twice the minimum value min_diff is the timing for the update and reuse of the link information in the entry E of the cache link 51.

When the update and reuse timing of the link information in the entry E of the cache link 51 is reached, the entry E for which the link information is updated (hereinafter referred to as an update target entry E) is determined. Specifically, as candidates for the update target entry E, a pair of the entries E that are closest to the beginning of the cache link 51 are selected from among pairs of the entries E which are adjacent to each other and for which the difference between the offset values is equal to the minimum value min_diff. Then, of the selected pair of the entries E, the later entry E is determined as the update target entry E.

In response to this, the update target entry E is removed from the current position of the cache link 51, and the entries E that are located before and after the update target entry E are connected. Meanwhile, the link information of the update target entry E is updated to the link information of the additionally written cluster. Then, the update target entry E is connected to the endmost position of the cache link 51.

In the example shown in FIG. 6, at a point in time at which the data is additionally written as far as a cluster [63] whose offset value is 29, the update and reuse timing of the cache link 51 is not reached. More specifically, in this case, the value of wp is 29 and the value of ceof is 20 that is the offset value included in the entry E5 located at the end of the current cache link 51. Therefore, the difference wp−ceof is 9. Further, the offset values of the entries E1 to E5 that are adjacent to each other in the current cache link 51 are 0, 5, 10, 15 and 20, respectively. As a result, differences between the offset values are all 5, and therefore, the minimum value of the difference between the offset values is also 5. Accordingly, the value of min_diff is 5 and the value that is twice the value of min_diff is 10. More specifically, at the point in time at which the data is additionally written as far as the cluster [63] whose offset value is 29, the difference wp−ceof is not twice the interval between the cache points. Therefore, the update and reuse timing of the cache link 51 is not reached.

Next, when the data is additionally written as far as a cluster [64] whose offset value is 30, the update and reuse timing of the cache link 51 is reached. More specifically, in this case, the value of wp is 30 and the value of ceof is 20 that is the offset value included in the entry E5 located at the end of the current cache link 51. Therefore, the difference wp−ceof is 10. Further, the offset values of the entries E1 to E5 that are adjacent to each other in the current cache link 51 are 0, 5, 10, 15 and 20, respectively. As a result, differences between the offset values are all 5, and therefore, the minimum value of the difference between the offset values is also 5. Accordingly, the value of min_diff is 5 and the value that is twice the value of min_diff is 10. More specifically, at the point in time at which the data is additionally written as far as the cluster [64] whose offset value is 30, the difference wp−ceof is twice the interval between the cache points. Therefore, the update and reuse timing of the link information in the entry E of the cache link 51 is reached.

When the update and reuse timing of the link information in the entry E of the cache link 51 is reached, the update target entry E is determined. As candidates for the update target entry E, namely, as pairs of the entries E which are adjacent to each other and for which the difference between the offset values is equal to the minimum value min_diff (i.e., 5), there are four pairs, i.e., a pair of the entry E1 and the entry E2, a pair of the entry E2 and the entry E3, a pair of the entry E3 and the entry E4, and a pair of the entry E4 and the entry E5. From among the four pairs, the pair of the entry E1 and the entry E2 that is closest to the beginning of the cache link 51 is selected. Then, of the selected pair of the entry E1 and the entry E2, the later entry E2 is determined as the update target entry E.

In response to this, the entry E2 determined as the update target is removed from the current position of the cache link 51, and the entry E1 and the entry E3 that are located before and after the update target entry E2 are connected. Meanwhile, the link information of the update target entry E2 is updated to "30, 64, 16" that is the link information of the additionally written the cluster [64]. Then, the update target entry E2 is connected to the endmost position of the cache link 51, and an entry E6 is generated. At this point in time, the entries E included in the cache link 51 are the entry E1 and the entries E3 to E6, and the offset values of the respective entries E that are adjacent to each other are 0, 10, 15, 20 and 30.

Further, the cluster data is additionally written. At a point in time at which the data is additionally written as far as a cluster [65] whose offset value is 31, the update and reuse timing of the cache link 51 is not reached. More specifically, in this case, the value of wp is 31 and the value of ceof is 30 that is the offset value included in the entry E6 located at the end of the current cache link 51. Therefore, the difference wp−ceof is 1. Further, the offset values of the entries E1 and E3 to E6 that are adjacent to each other in the current cache link 51 are 0, 10, 15, 20 and 30, respectively. As a result, differences between the offset values are 5 or 10, and therefore, the minimum value of the difference between the offset values is 5. Accordingly, the value of min_diff is 5 and the value that is twice the value of min_diff is 10. More specifically, at the point in time at which the data is additionally written as far as the cluster [65] whose offset value is 31, the difference wp−ceof is not twice the interval between the cache points. Therefore, the update and reuse timing of the cache link 51 is not reached.

Further, the cluster data is additionally written. At a point in time at which the data is additionally written as far as a cluster [73] whose offset value is 39, the update and reuse timing of the cache link 51 is not reached. More specifically, in this case, the value of wp is 39 and the value of ceof is 30 that is the offset value included in the entry E6 located at the end of the current cache link 51. Therefore, the difference wp−ceof is 9. Further, the offset values of the entries E1 to E6 that are adjacent to each other in the current cache link 51 are 0, 10, 15, 20 and 30, respectively. As a result, differences between the offset values are 5 or 10, and therefore, the minimum value of the difference between the offset values is 5. Accordingly, the value of min_diff is 5 and the value that is twice the value of min_diff is 10. More specifically, at the point in time at which the data is additionally written as far as the cluster [73] whose offset value is 39, the difference wp−ceof is not twice the interval between the cache points. Therefore, the update and reuse timing of the cache link 51 is not reached.

Next, when the data is additionally written as far as a cluster [74] whose offset value is 40, the update and reuse timing of the cache link 51 is reached. More specifically, in this case, the value of wp is 40 and the value of ceof is 30 that is the offset value included in the entry E6 located at the end of the current cache link 51. Therefore, the difference wp−ceof is 10. Further, the offset values of the entries E1 to E6 that are adjacent to each other in the current cache link 51 are 0, 10, 15, 20 and 30, respectively. As a result, differences between the offset values are 5 or 10, and therefore, the minimum value of the difference between the offset values is 5. Accordingly, the value of min_diff is 5 and the value that is twice the value of min_diff is 10. More specifically, at the point in time at which the data is additionally written as far as the cluster [74] whose offset value is 40, the difference wp−ceof is twice the interval between the cache points. Therefore, the update and reuse timing of the link information in the entry E of the cache link 51 is reached.

When the update and reuse timing of the link information in the entry E of the cache link 51 is reached, the update target entry E is determined. As candidates for the update target entry E, namely, as pairs of the entries E which are adjacent to each other and for which the difference between the offset values is equal to the minimum value min_diff (i.e., 5), there are two pairs, i.e., a pair of the entry E3 and the entry E4 and a pair of the entry E4 and the entry E5. Of the two pairs, the pair of the entry E3 and the entry E4 that is closest to the beginning of the cache link 51 is selected. Then, of the selected pair of the entry E3 and the entry E4, the later entry E4 is determined as the update target entry E.

In response to this, the entry E4 determined as the update target is removed from the current position of the cache link 51, and the entry E3 and the entry E5 that are located before and after the update target entry E4 are connected. Meanwhile, the link information of the update target entry E4 is updated to "40, 74, 6" that is the link information of an additionally written cluster [40]. Then, the update target entry E4 is connected to the endmost position of the cache link 51, and an entry E7 is generated. At this point in time, the entries E included in the cache link 51 are the entry E1, the entry E3, and the entries E5 to E7, and the offset values of the respective entries E that are adjacent to each other are 0, 10, 20, 30 and 40.

In this manner, the cache link 51 is generated such that the interval between the cache points is widened as the size of the FAT 41 is increased by additional data writing. Thus, the cache link 51 that includes new link information is generated without a change in the size of the cache link 51. Further, the link information that is included in a part of the entries E of the cache link 51 before additional data writing is updated to the link information of the cluster after additional data writing, and the part of the entries E is reused. Thus, as compared to a case in which the cache link 51 is generated from the very beginning, it is possible to reduce the generation time.

Next, among the functional portions included in the file management system 1 shown in FIG. 1, a functional configuration example of the control portion 22 that achieves additional data writing to a file will be explained with reference to FIG. 7.

Functional Configuration Example of Control Portion

Figure 7:
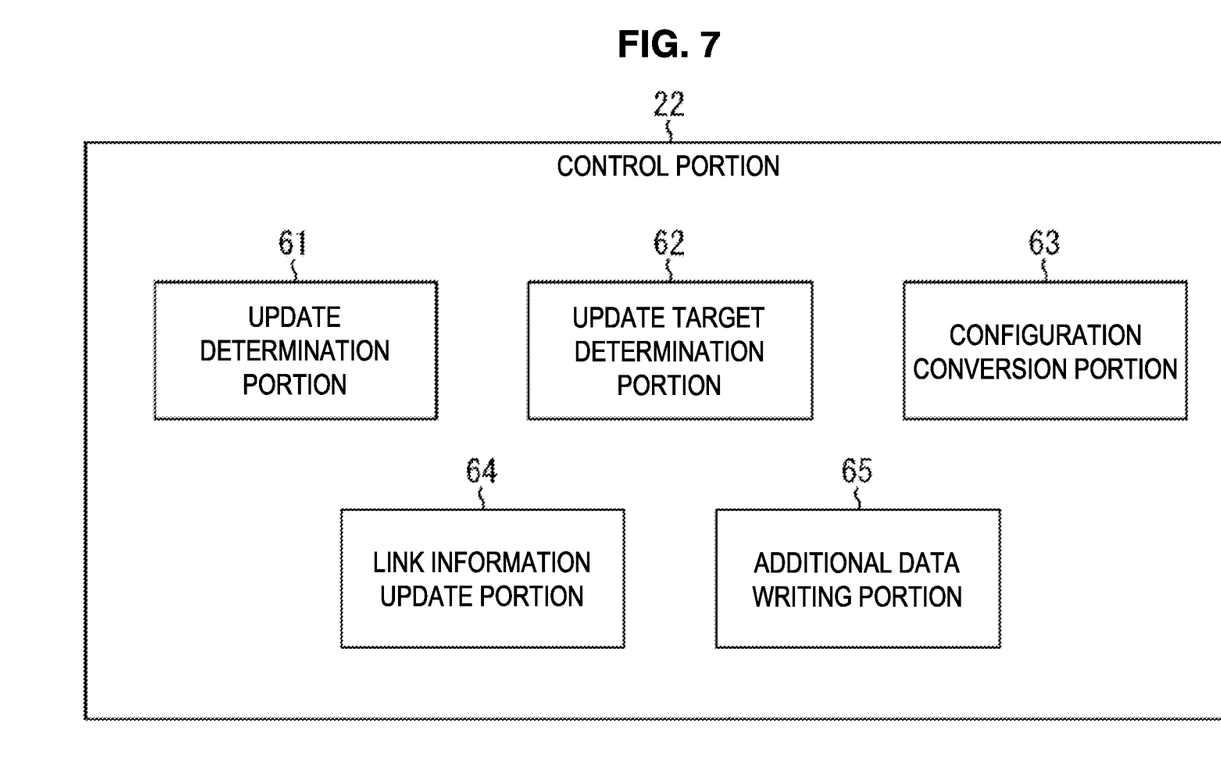
FIG. 7 is a block diagram showing a functional configuration example of a control portion.

FIG. 7 is a block diagram showing the functional configuration example of the control portion 22.

The control portion 22 includes an update determination portion 61, an update target determination portion 62, a configuration conversion portion 63, a link information update portion 64 and an additional data writing portion 65.

The update determination portion 61 determines whether or not the update and reuse timing of the cache link 51 is reached.

The update target determination portion 62 determines the update target entry E from among the plurality of the entries E included in the cache link 51.

The configuration conversion portion 63 removes the update target entry E determined by the update target determination portion 62 from an original position, and connects the update target entry E to the endmost position of the cache link 51. Further, after the update target entry E is removed from the cache link 51, the configuration conversion portion 63 connects the entries E that are located before and after the update target entry E. When converting the configuration of the cache link 51, the configuration conversion portion 63 updates information about the pointer to the next link destination entry E, among the pieces of information included in the entry E.

The link information update portion 64 updates the link information of the update target entry E determined by the update target determination portion 62 to the link information of the additionally written cluster.

The additional data writing portion 65 additionally writes the cluster data.

Processing of additional data writing (hereinafter referred to as additional writing processing) by the control portion 22 configured in this manner will be explained with reference to FIG. 8.

Additional Writing Processing

Figure 8:
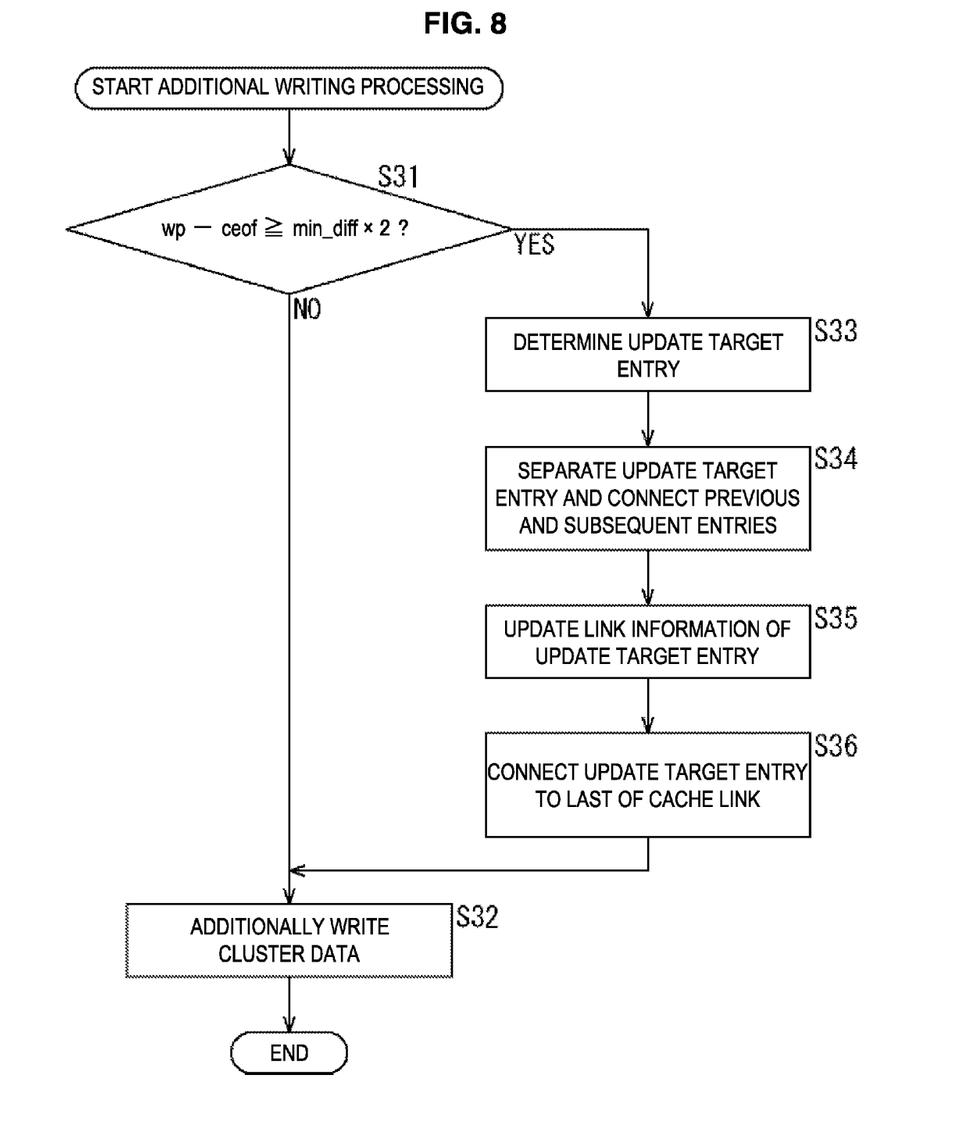
FIG. 8 is a flowchart illustrating a flow of additional writing processing.

FIG. 8 is a flowchart illustrating a flow of the additional writing processing The additional writing processing is started when the user performs a predetermined operation on the operation portion 21.

At step S31, the update determination portion 61 determines whether or not wp−ceof≥min_diff×2 is satisfied. More specifically, the update determination portion 61 determines whether or not the difference between the offset value wp of the cluster that is currently being additionally written and the offset value ceof included in the entry E located at the end of the current cache link 51 is equal to or more than twice the minimum value min_diff of the difference between the offset values of the entries E that are adjacent to each other in the current cache link 51.

When wp−ceof<min_diff×2, NO is determined at step S31 and the processing proceeds to step S32.

At step S32, the additional data writing portion 65 additionally writes cluster data. That is, in this case, the link information of the cache link 51 is not updated.

When the cluster data is additionally written, the additional writing processing ends. Note that the control portion 22 stands by until the writing processing for next data is commanded.

On the other hand, when wp−ceof≥min_diff×2 is satisfied, YES is determined at step S31 and the processing proceeds to step S33. That is, a timing at which wp−ceof≥min_diff×2 is satisfied is the update and reuse timing of the link information in the entry E of the cache link 51.

At step S33, the update target determination portion 62 determines the update target entry E. The update target determination portion 62 selects, as candidates for the update target entry E, a pair of the entries E that are closest to the beginning of the cache link 51, from among pairs of the entries E which are adjacent to each other and for which the difference between the offset values is equal to the minimum value min_diff. Then, of the selected pair of the entries E, the update target determination portion 62 determines the later entry E as the update target entry E.

At step S34, the configuration conversion portion 63 removes the update target entry E and connects the entries E that are located before and after the update target entry E.

At step S35, the link information update portion 64 updates the link information of the update target entry E. More specifically, the link information update portion 64 updates the link information of the update target entry E to the link information of the additionally written cluster.

At step S36, the configuration conversion portion 63 connects the update target entry E to the end of the cache link 51. When the update target entry E is connected to the end of the cache link 51, the processing proceeds to step S32.

At step S32, the additional data writing portion 65 additionally writes cluster data. That is, in this case, the cache link 51 is updated, and at the same time, the cluster data is additionally written.

This completes the additional writing processing.

In the above-described example, every time the offset value from the beginning of the predetermined file becomes equal to 5, the cache points of the cache link 51 are set. However, the interval between the cache points of the cache link 51 is not limited to this example, and a given interval may be used. Further, after the data is additionally written, the interval between the cache points of the cache link 51 is set to be twice the interval used before the data is additionally written. However, the interval between the cache points that is used after the data is additionally written is not limited to this example, and it is sufficient if the interval between the cache points that is used after the data is additionally written is wider than the interval between the cache points used before the data is additionally written.

In this manner, even if the size of the FAT 41 is increased by additional data writing, the cache link 51 that includes new link information is generated without a change in the size of the cache link 51. Therefore, even if the memory size of the cluster link cache 23 is limited, it is possible to record the cache link 51 that includes the new link information.

Further, when the cache link 51 that includes the new link information is generated, the link information that is included in a part of the entries E of the cache link 51 before additional data writing is updated to the link information of the cluster after additional data writing, and the part of the entries E is reused. Thus, it is possible to reduce the generation time of the cache link 51, and as a result, it is possible to improve the processing speed for writing.

Further, even after the data is additionally written, it is possible to track the FAT from the Read point by referring to the cache link 51 that includes the new link information. Therefore, even after the data is additionally written, it is possible to improve the processing speed as compared to a case in which the FAT is tracked from the beginning of the FAT as in the related art.

Application of the Present Technology to Program

The above-described series of processing may be performed by hardware or may be performed by software.

Figure 9:
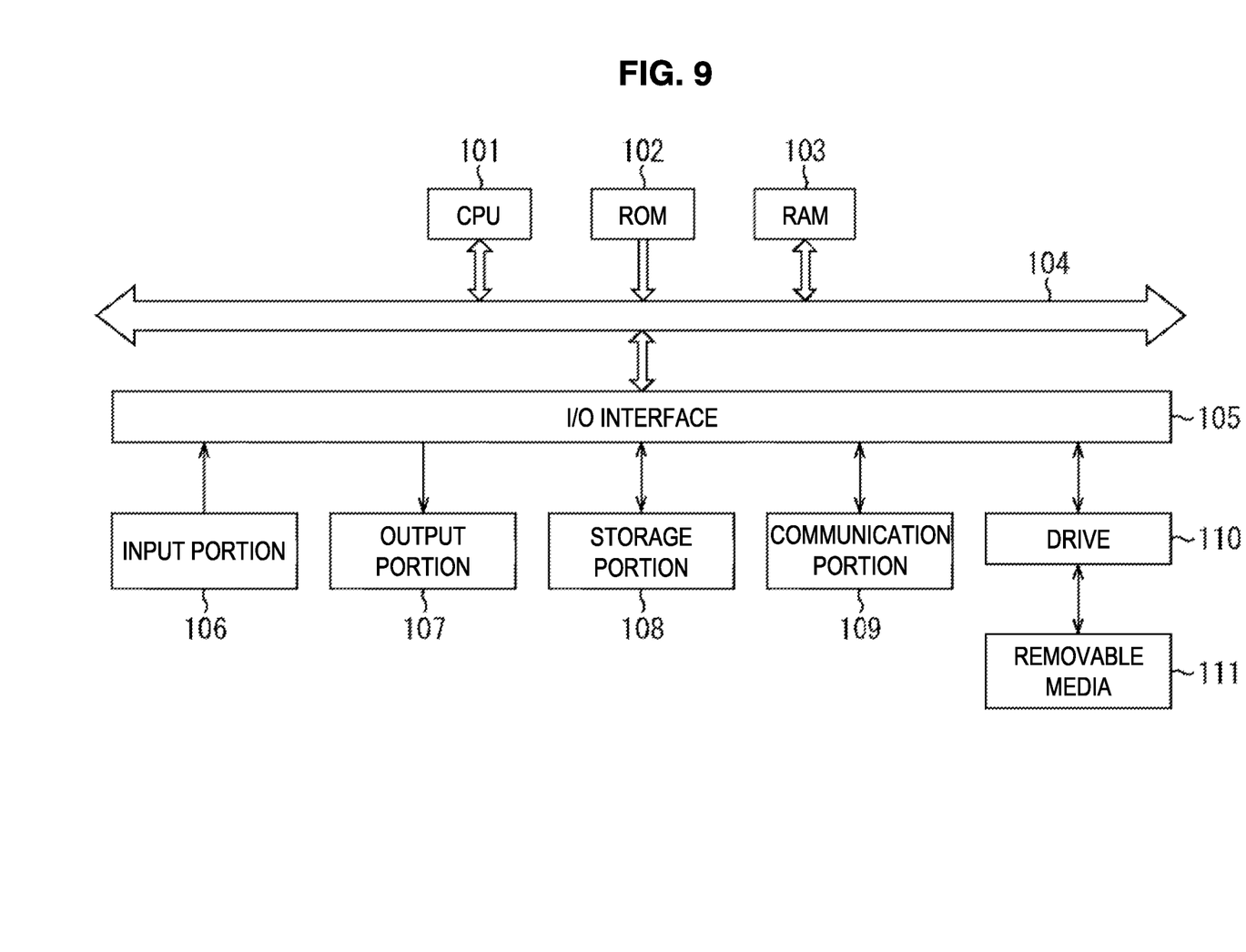
FIG. 9 is a block diagram showing a hardware configuration example of an information processing device to which the present technology is applied.

In this case, a personal computer shown in FIG. 9, for example, may be used as at least a part of the above-described information processing device.

In FIG. 9, a CPU 101 performs various types of processing in accordance with a program stored in a read only memory (ROM) 102. Further, the CPU 101 performs various types of processing in accordance with a program that is loaded from a storage portion 108 to a random access memory (RAM) 103. Data etc. that is necessary for the CPU 101 to perform the various types of processing is also stored in the RAM 103 as appropriate.

The CPU 101, the ROM 102 and the RAM 103 are mutually connected via a bus 104. An input output (I/O) interface 105 is also connected to the bus 104.

An input portion 106 that is formed by a keyboard, a mouse and the like, and an output portion 107 that is formed by a display and the like are connected to the I/O interface 105. Further, the storage portion 108 that is formed by a hard disk and the like, and a communication portion 109 that is formed by a modem, a terminal adaptor and the like are connected to the I/O interface 105. The communication portion 109 controls communication that is performed with another device (not shown in the drawings) via a network including the Internet.

Further, a drive 110 is connected to the I/O interface 105 according to need. A removable media 111 that is formed by a magnetic disk, an optical disk, a magneto optical disk, a semiconductor memory, or the like is attached as appropriate. Then, a computer program that is read from the removable media 111 is installed in the storage portion 108 according to need.

When the series of processing is performed by software, a program that forms the software is installed from a network or a recording medium to a computer that is incorporated in a dedicated hardware, or to, for example, a general-purpose personal computer that can perform various types of functions by installing various types of programs.

The recording medium that includes this type of program is not only formed by the removable media (package media) 111 that is distributed separately from a main body of the device as shown in FIG. 9 in order to provide the user with the program, but is also formed by the ROM 102 in which the program is recorded and which is provided to the user in a state in which it is incorporated in advance in the main body of the device, the hard disk included in the storage portion 108, or the like. The removable media 111 is formed by a magnetic disk (including a floppy disk) in which the program is recorded, an optical disk (including a compact disk-read only memory (CD-ROM) and a digital versatile disk (DVD)), a magneto optical disk (including a mini-disk (MD)), a semiconductor memory, or the like.

Note that, in this specification, steps that write the program to be recorded in the recording medium do not necessarily have to be performed in time series in line with the order of the steps, and instead may include processing that is performed in parallel or individually.

The embodiment of the present technology is not limited to the above-described embodiment. It should be understood by those skilled in the art that various modifications, combinations, sub-combinations and alterations may occur depending on design requirements and other factors insofar as they are within the scope of the appended claims or the equivalents thereof.

Note that the present technology can also take the following configurations.

(1) An information processing device including:

a cache link holding portion that caches a cache link that is formed such that, when a plurality of clusters are recorded on a predetermined recording medium by a FAT file system and a FAT formed by link information of the plurality of clusters is also recorded on the predetermined recording medium by the FAT file system, an entry is arranged for each of the clusters located at a predetermined interval, the entry being formed by information including the link information that is extracted from the FAT;

an information update portion that, when updating the cache link after data is additionally written to the clusters on the recording medium, updates the information for an update target entry among a plurality of the entries that form the cache link; and a configuration conversion portion that removes the update target entry updated by the information update portion from an original position in the cache link, and connects the update target entry to an endmost position of the cache link.

(2) The information processing device according to (1) above, in which the entry includes, as the information, an offset value, a cluster number and a number of consecutive clusters.

(3) The information processing device according to (1) or (2) above, in which the cache link is updated based on a distance from the offset value that is included in a last entry of the cache link to an offset value of a cluster that is a target for additional writing.

(4) The information processing device according to any one of (1) to (3) above, in which the cache link is updated when the distance from the offset value that is included in the last entry of the cache link to the offset value of the cluster that is the target for additional writing is equal to a predetermined multiple of a minimum value difference between the offset values of the entries that are adjacent to each other in the cache link.

The present technology can be applied to an information processing device that uses a FAT file system.

The present disclosure contains subject matter related to that disclosed in Japanese Priority Patent Application JP 2011-132018 filed in the Japan Patent Office on Jun. 14, 2011, the entire content of which is hereby incorporated by reference.

What is claimed is:

1. An information processing device comprising:

a holding portion of a cache link that is formed such that, when a plurality of clusters are recorded on a predetermined recording medium by a FAT file system and a FAT formed by link information of the plurality of clusters is also recorded on the predetermined recording medium by the FAT file system, an entry is arranged for each of the clusters located at a predetermined interval, the entry being formed by information including the link information that is extracted from the FAT;

an information update portion that, when updating the cache link after data is additionally written to the clusters on the recording medium, updates the information for an update target entry among a plurality of the entries that form the cache link; and a configuration conversion portion that removes the update target entry updated by the information update portion from an original position in the cache link, and connects the update target entry to an endmost position of the cache link.

2. The information processing device according to claim 1, wherein
the entry includes, as the information, an offset value, a cluster number and a number of consecutive clusters.

3. The information processing device according to claim 2, wherein
the cache link is updated based on a distance from the offset value that is included in a last entry of the cache link to an offset value of a cluster that is a target for additional writing.

4. The information processing device according to claim 3, wherein
the cache link is updated when the distance from the offset value that is included in the last entry of the cache link to the offset value of the cluster that is the target for additional writing is equal to a predetermined multiple of a minimum value difference between the offset values of the entries that are adjacent to each other in the cache link.

5. An information processing method comprising:
caching a cache link that is formed such that, when a plurality of clusters are recorded on a predetermined recording medium by a FAT file system and a FAT formed by link information of the plurality of clusters is also recorded on the predetermined recording medium by the FAT file system, an entry is arranged for each of the clusters located at a predetermined interval, the entry being formed by information including the link information that is extracted from the FAT;

updating, when updating the cache link after data is additionally written to the clusters on the recording medium, the information for an update target entry among a plurality of the entries that form the cache link; and removing the update target entry updated by the information updating processing from an original position in the cache link, and connecting the updated update target entry to an endmost position of the cache link.

6. The information processing method according to claim 5, wherein
the entry includes, as the information, an offset value, a cluster number and a number of consecutive clusters.

7. The information processing method according to claim 6, wherein
the cache link is updated based on a distance from the offset value that is included in a last entry of the cache link to an offset value of a cluster that is a target for additional writing.

8. The information processing method according to claim 7, wherein
the cache link is updated when the distance from the offset value that is included in the last entry of the cache link to the offset value of the cluster that is the target for additional writing is equal to a predetermined multiple of a minimum value difference between the offset values of the entries that are adjacent to each other in the cache link.

9. A non-transitory computer-readable medium having embodied thereon a program, which when executed by a computer causes the computer to perform a control processing method, the method comprising:
caching a cache link that is formed such that, when a plurality of clusters are recorded on a predetermined recording medium by a FAT file system and a FAT formed by link information of the plurality of clusters is also recorded on the predetermined recording medium by the FAT file system, an entry is arranged for each of the clusters located at a predetermined interval, the entry being formed by information including the link information that is extracted from the FAT;

updating, when updating the cache link after data is additionally written to the clusters on the recording medium, the information for an update target entry among a plurality of the entries that form the cache link; and removing the updated update target entry from an original position in the cache link, and connecting the updated update target entry to an endmost position of the cache link.

10. The non-transitory computer-readable medium according to claim 9, wherein
the entry includes, as the information, an offset value, a cluster number and a number of consecutive clusters.

11. The non-transitory computer-readable medium according to claim 10, wherein
the cache link is updated based on a distance from the offset value that is included in a last entry of the cache link to an offset value of a cluster that is a target for additional writing.

12. The non-transitory computer-readable medium according to claim 11, wherein
the cache link is updated when the distance from the offset value that is included in the last entry of the cache link to the offset value of the cluster that is the target for additional writing is equal to a predetermined multiple of a minimum value difference between the offset values of the entries that are adjacent to each other in the cache link.

* * * * *